United States Patent
De Smedt et al.

(10) Patent No.: US 11,457,566 B2
(45) Date of Patent: Oct. 4, 2022

(54) CROP DISCHARGE SPEED CONTROL FOR A FORAGE HARVESTER

(71) Applicant: CNH Industrial America LLC, New Holland, PA (US)

(72) Inventors: Bart De Smedt, Ledeberg (BE); Didier Verhaeghe, Ypres (BE); Jeroen Vermander, Middelkerke (BE); Simon Beelaert, Adegem (BE)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 16/628,544

(22) PCT Filed: Jul. 2, 2018

(86) PCT No.: PCT/EP2018/067758
§ 371 (c)(1),
(2) Date: Jan. 3, 2020

(87) PCT Pub. No.: WO2019/007877
PCT Pub. Date: Jan. 10, 2019

(65) Prior Publication Data
US 2020/0214205 A1    Jul. 9, 2020

(30) Foreign Application Priority Data
Jul. 3, 2017    (BE) .................................. 2017/5473

(51) Int. Cl.
*A01D 43/08*    (2006.01)
*A01D 41/127*    (2006.01)
(Continued)

(52) U.S. Cl.
CPC ......... *A01D 43/085* (2013.01); *A01D 43/086* (2013.01); *A01D 41/127* (2013.01);
(Continued)

(58) Field of Classification Search
CPC .. A01D 43/085; A01D 43/086; A01D 43/087; A01D 41/127; A01D 43/10; A01F 29/12; G05D 2201/0201
See application file for complete search history.

(56) References Cited

U.S. PATENT DOCUMENTS

| | | | | |
|---|---|---|---|---|
| 3,739,367 A | * | 6/1973 | Fathauer | G01P 1/106 340/658 |
| 4,614,305 A | * | 9/1986 | Fekete | A01D 41/1274 241/101.2 |

(Continued)

FOREIGN PATENT DOCUMENTS

| | | |
|---|---|---|
| DE | 102005038553 A1 | 2/2007 |
| DE | 102014102221 A1 | 8/2015 |

(Continued)

OTHER PUBLICATIONS

Oliver Schmittman et al., Durchsatzmessung bei Feldhackslern, Landtechnick Apr. 2000, deel 55, nr. 4, Dec. 31, 2000.

(Continued)

*Primary Examiner* — Alicia Torres
*Assistant Examiner* — Matthew Ian Neal
(74) *Attorney, Agent, or Firm* — Peter Zacharias; Patrick Sheldrake

(57) ABSTRACT

A crop discharge speed control system for a harvesting vehicle having a crop accelerator and a spout that receives crop material and directs the crop material to a targeted destination. The crop accelerator imparts an increased velocity to the crop material. The control system includes a crop velocity sensor, a controller, and a variable speed drive. The sensor is coupled to the spout of the vehicle for detecting a velocity of the crop material in the spout. The sensor produces a velocity signal representative of the velocity of the crop material. The variable speed drive is drivingly coupled to the crop accelerator. The controller varies the (Continued)

speed of the crop accelerator by controlling the variable speed drive, as it controls the variable speed drive to maintain a selected velocity of the crop material dependent upon a modulation of the velocity signal.

16 Claims, 7 Drawing Sheets

(51) Int. Cl.
*A01F 29/12* (2006.01)
*A01D 43/10* (2006.01)

(52) U.S. Cl.
CPC .............. *A01D 43/10* (2013.01); *A01F 29/12* (2013.01); *G05D 2201/0201* (2013.01)

(56) References Cited

U.S. PATENT DOCUMENTS

| | | | | |
|---|---|---|---|---|
| 6,421,990 | B1* | 7/2002 | Ohlemeyer | A01D 41/127 356/328 |
| 7,063,614 | B2* | 6/2006 | Vogelgesang | A01D 43/087 460/114 |
| 8,317,578 | B2* | 11/2012 | Kormann | A01D 43/085 460/115 |
| 8,554,424 | B2* | 10/2013 | Kormann | A01D 43/085 701/50 |
| 8,915,144 | B2* | 12/2014 | Hien | A01C 7/105 73/861 |
| 9,089,092 | B2* | 7/2015 | Diekhans | A01D 43/085 |
| 2006/0234790 | A1* | 10/2006 | Kormann | A01D 43/086 460/119 |
| 2007/0037621 | A1 | 2/2007 | Isfort | |
| 2012/0151891 | A1* | 6/2012 | Wolfcarius | A01D 43/085 56/10.2 A |
| 2018/0027734 | A1* | 2/2018 | Hien | A01D 43/085 |

FOREIGN PATENT DOCUMENTS

| | | |
|---|---|---|
| EP | 1065920 B1 | 3/1999 |
| EP | 1380204 A1 | 1/2004 |
| EP | 2974587 A1 | 1/2016 |
| WO | 2016/134684 A1 | 9/2016 |

OTHER PUBLICATIONS

International Search Report and Written Opinion for PCT/EP2018/067758 dated Sep. 10, 2018 (13 pages).

* cited by examiner

CROP DISCHARGE SPEED CONTROL FOR A FORAGE HARVESTER

BACKGROUND OF THE INVENTION

The present invention relates to a crop discharge speed control for use with a forage harvester.

Forage harvesters are machines which chop crop gathered from a field into small pieces to produce animal feed. In the case of mainly leaf type crops such as grass or alfalfa, these will have been pre-cut and left to dry in the sun, so that the crop only needs to be gathered by the harvester. With other crops, such as maize, the forage harvester may also be equipped with a header, which cuts the standing crop.

The crop, whether cut maize or gathered grass, is fed into a rotating knife drum or cutter which comminutes the product. The momentum of a crop, such as maize, from the crop processor or the grass from the cutter, as the case may be, carries the crop into an accelerator or blower which then propels it up a tower to a discharge spout through which it is discharged into a wagon or a trailer, which may be drawn by a separate vehicle driven alongside or behind the harvester.

In a forage harvester, the discharge path for the processed crop commonly includes a stationary tower and a curved spout connected to the tower. The spout, which can usually be rotated relative to the tower about a vertical axis, projects laterally or rearwardly from the body of the harvester to discharge the processed crop into a container, which is either pulled by the harvester or is mounted on a vehicle driven alongside or behind the harvester.

A problem with this method is that the accelerator is driven at a fixed speed that is set to realize a crop stream over a large operative distance, typically the distance from the spout outlet to a container driven behind the harvester. For shorter distances and other directions, the operator has to watch the trajectory and make adjustments to the orientation of the spout and the deflector mounted at its end. Where the rotation speed of the accelerator can be modified, the operator also has to derive from the watched trajectory any necessary or advantageous adjustments to the accelerator speed.

What is needed in the art is a control system that uses the crop stream speed to control the accelerator speed.

SUMMARY OF THE INVENTION

The present invention provides a control of the speed of the crop material that is discharged from a spout of a forage harvester.

The invention in one form is directed to a crop discharge speed control system for a harvesting vehicle having a crop accelerator and a spout that receives the crop material and directs the crop material to a targeted destination. The crop accelerator imparts an increased velocity to the crop material. The control system includes a crop velocity sensor, a controller and a variable speed drive. The sensor is coupled to the spout of the vehicle for the detection of a velocity of the crop material in the spout, the sensor produces a velocity signal representative of the velocity of the crop material. The variable speed drive is drivingly coupled to the crop accelerator. The controller varies the speed of the crop accelerator by controlling the variable speed drive, as it controls the variable speed drive to maintain a selected velocity of the crop material dependent upon a modulation of the velocity signal.

In another embodiment of the invention the crop velocity sensor does not contact the crop material as it moves through the spout.

In a further embodiment the spout has a transparent portion with the crop velocity sensor being directed toward the transparent portion.

In yet another embodiment the transparent portion is transparent to an emitted signal from the crop velocity sensor.

In still yet another embodiment the crop velocity sensor is a radar sensor.

In still yet another embodiment the radar sensor uses a Doppler measurement technique to measure the crop velocity and to construct the velocity signal.

In still yet another embodiment the radar sensor is configured to measure the velocity of the crop material as the crop material travels in the spout away from the radar sensor.

In still yet another embodiment the crop velocity sensor is coupled to the spout toward a distal end of the spout.

In still yet another embodiment the controller is further configured to control the variable speed drive by using a proportional-integral-derivative (PID) algorithm.

In still yet another embodiment the controller is further configured to keep the velocity of the crop material above a selected critical speed value.

In still yet another embodiment the controller is configured to automatically select a critical speed value based upon one or more of a type of crop, a moisture level of the crop and/or a yield of the crop.

In still yet another embodiment the controller is configured to receive and store a critical speed value selected by an operator.

In still yet another embodiment the control system includes a crop deflector coupled to an end of the spout, the crop deflector having an angle sensor and/or a load cell coupled to the deflector, at least one of the angle sensor and the load cell being configured to produce a deflector signal that is communicated to the controller, the controller is further configured to vary the speed of the crop accelerator dependent upon the deflector signal.

In still yet another embodiment the controller is further configured to give an alarm if the speed of the crop accelerator is below a threshold speed.

In still yet another embodiment, the controller is configured to control the speed of the crop accelerator by controlling the RPM of an engine of the harvesting vehicle.

In still yet another embodiment the harvesting vehicle is a forage harvester.

An advantage of the present invention is that the crop discharge speed control system optimizes the engine RPMs to maintain ideal crop processing speeds.

Another advantage is that the operator is advised to adjust settings to fine tune the crop flow performance, such as, to optimize the header speed setting; the crop transition from the header to a concave; as well as the accelerator settings.

A further advantage is that the operator is warned of the detection of operation out of the preferred range and even that a blockage has occurred or is about to occur.

Still yet another advantage is that the present invention improves the projected location of the crop stream as it lands at a targeted location in a crop destination vehicle to thereby efficiently fill the crop container.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "fore", "aft", "left" and "right", when used in connection with the vehicle and/or components thereof are usually determined with reference to the direction of forward operative travel of the vehicle, but they should not be construed as limiting. The terms "longitudinal" and "transverse" are determined with reference to the fore-and-aft direction of the vehicle and are equally not to be construed as limiting.

Figure 1:
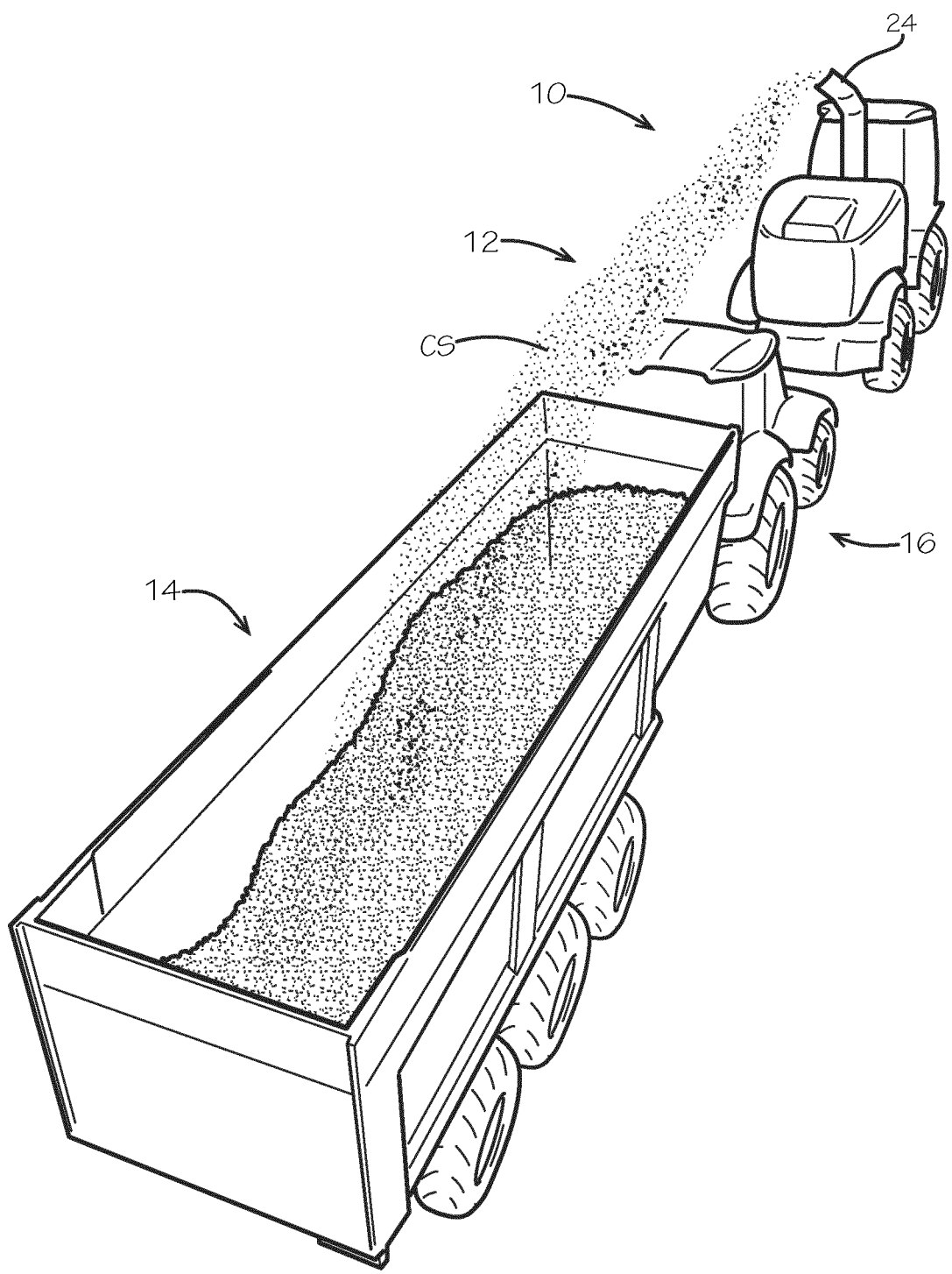
FIG. 1 is a perspective view of an embodiment of a forage harvester having a crop discharge speed control of the present invention.

Referring now to the drawings, and more particularly to FIG. 1, there is shown an exemplary embodiment of a harvesting vehicle 10 in the form of a forage harvester 10 that directs a crop stream CS along a crop trajectory 12 to a receiving vehicle 14 pulled by a tractor 16.

Figure 2:
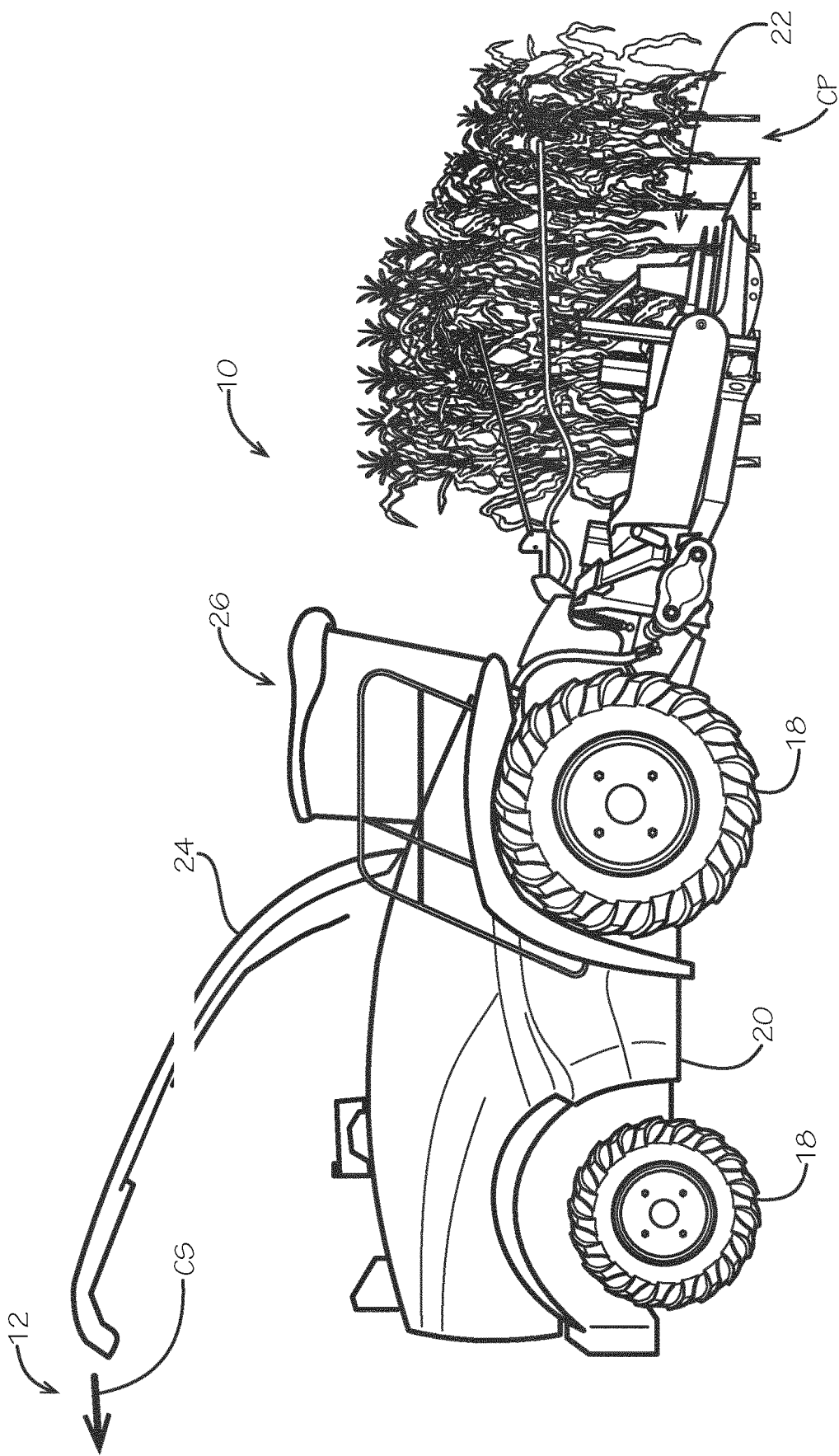
FIG. 2 is a side view of the forage harvester of FIG. 1.

Now, additionally referring to FIG. 2, there is shown a side view of forage harvester 10 which has wheels 18, a chassis 20, a header 22, a spout 24 and an operator cab 26. The wheels 18 carry the chassis 20, which in turn supports the header 22. The header 22 is selected to harvest, i.e. to cut and collect, the crop CP from the field as the forage harvester 10 goes in a fore direction. The harvested crop is processed and is chopped into small pieces for storage in a silo and eventually for feeding to animals. The crop stream CS is directed along the trajectory 12, shown as a longitudinal aft direction in FIG. 1, so as to effectively and uniformly fill the receiving vehicle 14 by sending the crop stream to the targeted location.

Figure 3:
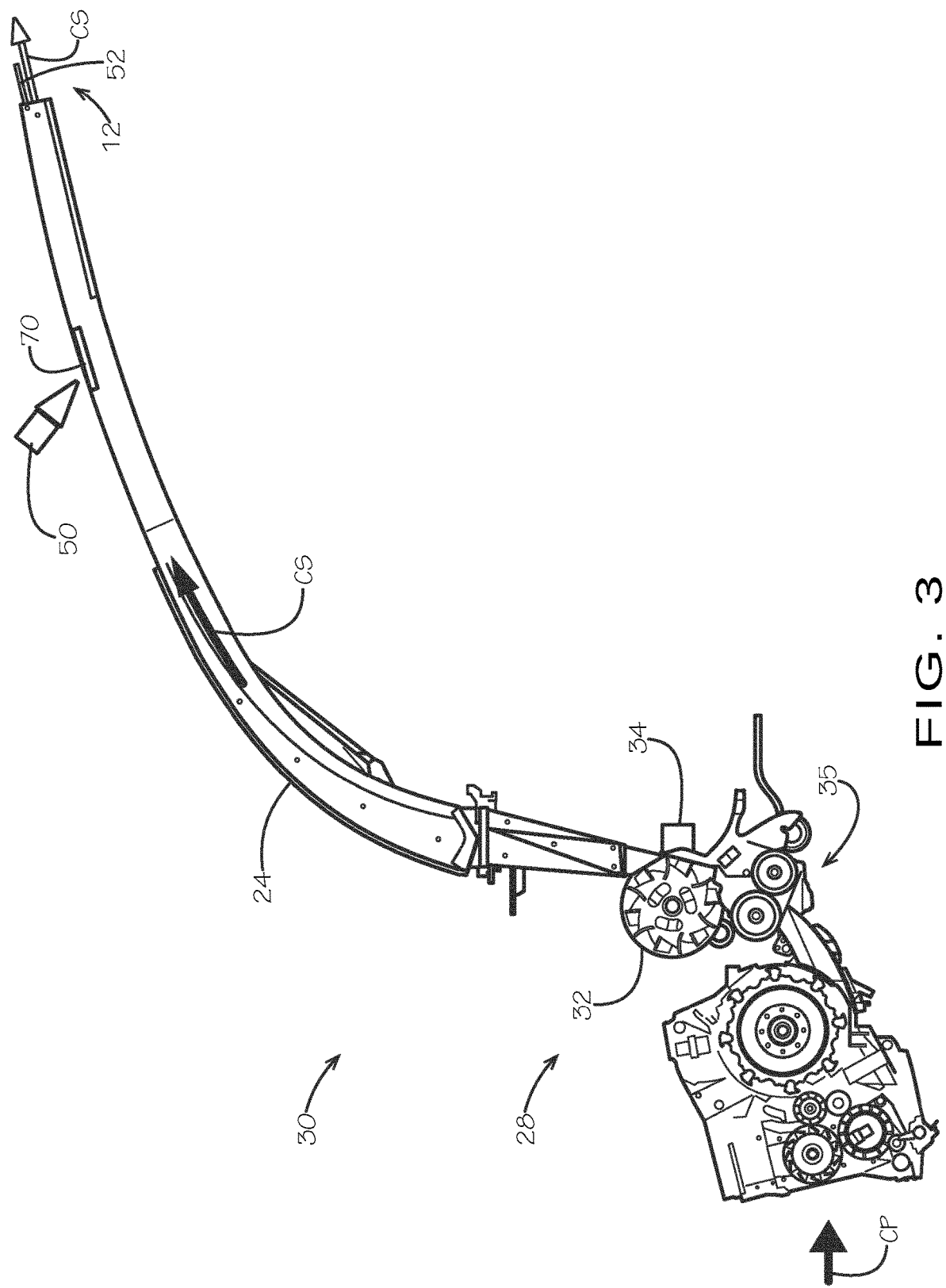
FIG. 3 is an illustration of the discharge system that is controlled by the crop discharge speed control system used by the forage harvester of FIGS. 1 and 2.
Figure 4:
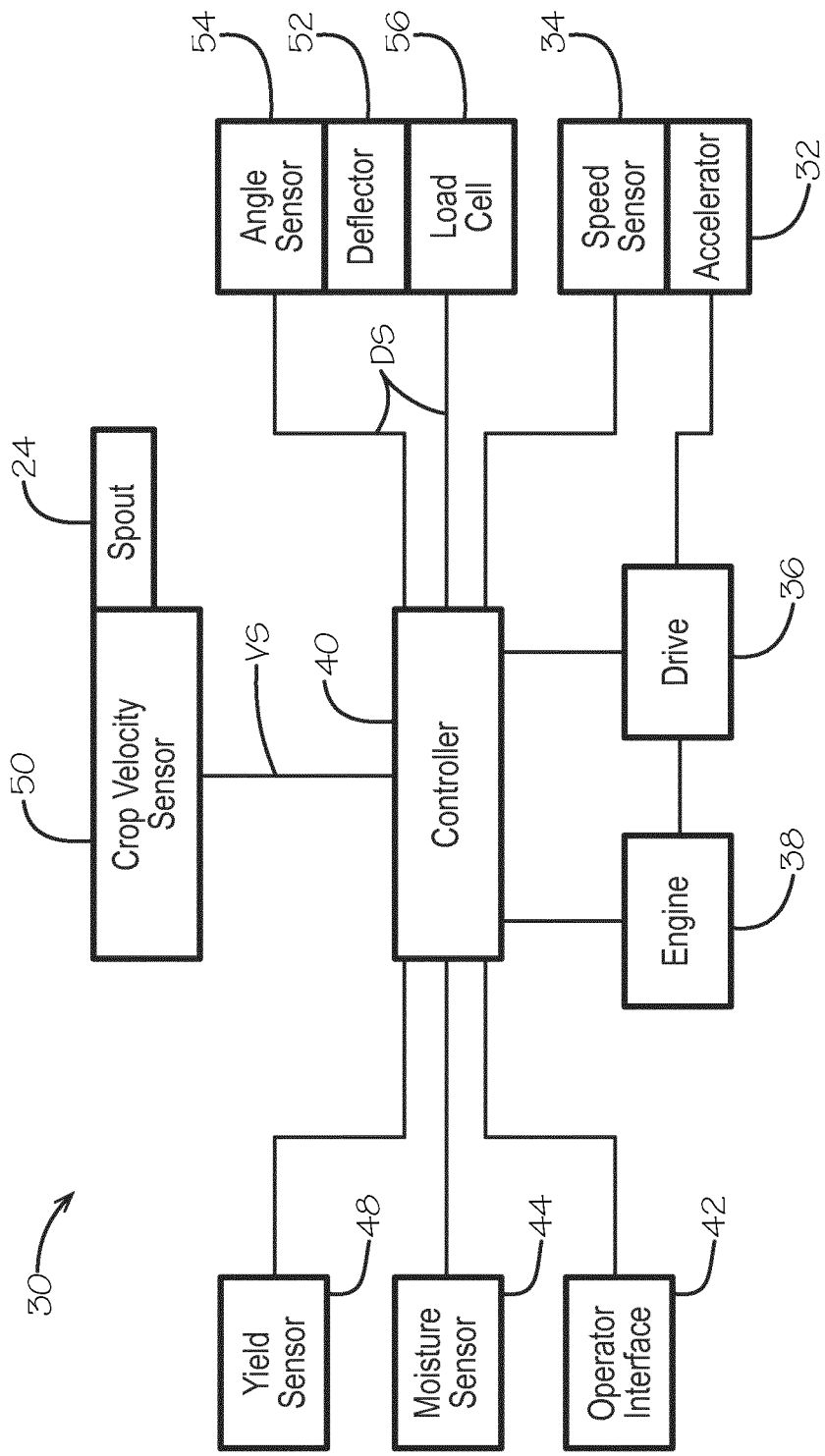
FIG. 4 is a schematic block diagram of elements of the crop discharge speed control system.
Figure 5:
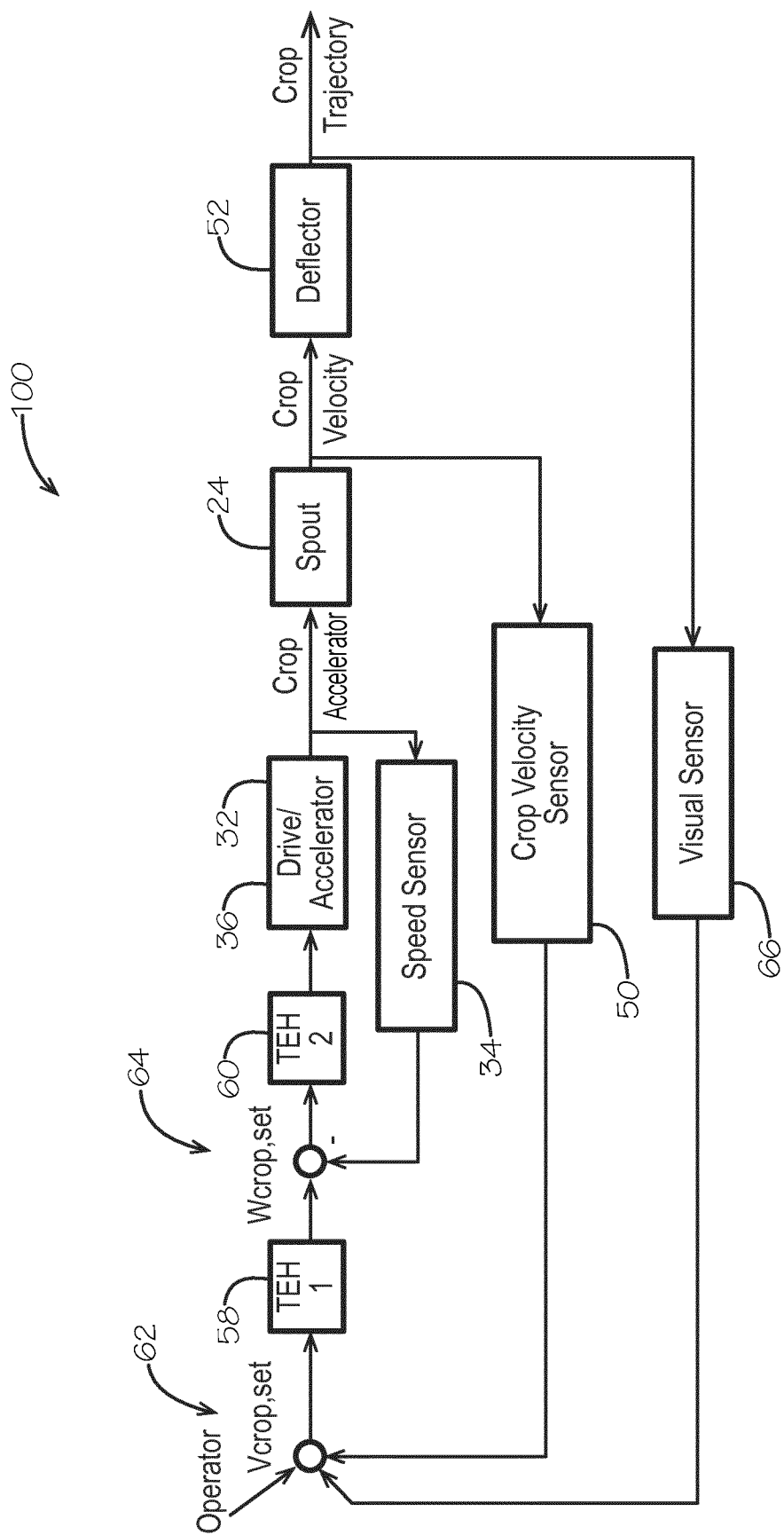
FIG. 5 is a block diagram that illustrates an algorithm of the crop discharge speed control system of the present invention.

Now, additionally referring to FIGS. 3-5, there is illustrated a crop discharge speed control system 30 for the harvesting vehicle 10 that gathers the crop material and processes the crop material in a crop processor 28. The harvesting vehicle 10 uses a crop accelerator 32 to accelerate the processed crop material into and through the spout 24. The spout 24 receives the crop material from the crop accelerator 32 and directs the crop material to a targeted destination in vehicle 14. The crop accelerator 32 is configured to impart an increased velocity to the crop material in the crop stream CS. There is a speed sensor 34 coupled to the crop accelerator 32 to produce a signal representative of the rotational speed of the crop accelerator 32. The speed sensor can use an encoded wheel, or use magnetic sensors to detect the rotation of the accelerator 32. The harvesting vehicle 10 additionally includes a variable speed drive 36, and an engine 38. The variable speed drive 36 is coupled to the engine 38 and the crop accelerator 32.

The crop discharge speed control system 30 includes a controller 40, an operator interface 42, a moisture sensor 44, a yield sensor 48, a crop velocity sensor 50, an actuator coupled to a pivotable deflector 52, an angle sensor 54 and a load cell 56. The crop velocity sensor 50 is coupled to the spout 24 of the harvesting vehicle 10 for the detection of a velocity of the crop material in the crop stream CS as it travels in the spout 24. The crop velocity sensor 50 is configured to produce a velocity signal VS representative of the velocity of the crop material CS. The controller 40 is in communication with the crop velocity sensor 50, and the controller 40 is configured to receive the velocity signal VS from the crop velocity sensor 50.

The operator interface 42 is located in cab 26 and is used to input selection from the operator as to what type of crop is being harvested and set points for the operation of control system 30. Information from the controller 40 is conveyed to the operator by way of the operator interface 42, such as the operational characteristics of the elements sensed by the various sensors coupled to the controller 40.

The engine 38 drives, either directly or indirectly, the variable speed drive 36, which is drivingly coupled to the crop accelerator 32, and the variable speed drive 36 is communicatively coupled to the controller 40. The controller 40 is configured to control the speed of the crop accelerator 32 by controlling the variable speed drive 36. The variable speed drive 36, for example, can comprise a continuously variable transmission (CVT) 36 having the ratio of the drive being determined by the controller 40, which also monitors the speed and torque available from the engine 38. Such CVT 36 may comprise a planetary gear system combining a mechanical drive by the engine 38 and a hydraulic drive by a motor that receives oil from a variable hydraulic pump, wherein the setting of the pump is controlled by the controller 40. The controller 40 is further configured to control the variable speed drive 36 to maintain a selected velocity of the crop material stream CS using feedback of the velocity signal VS. The crop velocity sensor 50 has a single measuring point at a window 70. It is contemplated that the variable speed drive 36 can also be carried out using a variable speed belt drive, a hydrostatic drive or an electric drive using a frequency based speed control. Further, it is also envisageable to simply adjust the speed of the engine to adjust the speed of all driven components, including the rotation speed of the crop accelerator 32.

The crop velocity sensor 50 does not contact the crop material as the crop stream CS moves through the spout 24. The window 70 is coupled to the spout 24 and forms a portion of the top wall of the spout 24, which can be considered a transparent portion 70. The crop velocity sensor 50 is directed toward the transparent portion 70 so that a signal emitted from the crop velocity sensor can pass therethrough and that a returning reflected signal can be received by the crop velocity sensor 50. The transparent portion 70 is transparent to the specific emitted signal from the crop velocity sensor 50, so that the velocity of the crop stream CS passing by the window 70 can be measured. The crop velocity sensor 50, can be a radar sensor 50, although other motion detecting sensors are also contemplated.

The radar sensor 50 uses a Doppler measurement technique to measure the crop velocity and to construct the velocity signal VS. In the present embodiment, the radar sensor 50 is configured to measure the velocity of the crop material CS as the crop material CS travels in the spout 24 away from the radar sensor 50. The crop velocity sensor 50 is coupled to the spout 24 toward a distal end of the spout 24, such as toward the end where the deflector 52 is coupled to the spout 24. Such position ensures that the measured crop velocity values are representative of the accumulated effects of the harvester components on the crop material stream CS.

The crop discharge speed control 30 uses the controller 40 to control the variable speed drive 36 by using an algorithm 100, which can be a proportional-integral-derivative (PID) algorithm 100. As can be seen in FIG. 5, a feedback system is contemplated where the speed sensor 34 of the crop accelerator 32 is used as one input to a summing operator 64, and the crop velocity sensor 50 and a visual sensor 66 are input to a summing junction 62. The visual sensor 66 detects the crop trajectory 12 using optical techniques. Such sensor may be comprise a stereo camera vision or a time-of-flight camera. A transition effects handler one (TEH1) 58 and a transition effects handler two (TEH2) 60 are used to scale the respective inputs thereto in order to respond to variations in the speed and torque variations of the accelerator 32 and to variations of the crop stream CS of the system 30.

The controller 40 is further configured to keep the velocity of the crop material CS above a selected critical speed, below which the crop material stream is prone to blocking or plugging at some position along the crop path between the knife drum and the cutterhead and the deflector 52. The actual critical speed is dependent upon a type of the crop (which can be input by the operator through the operator interface 42 or detected by a camera), a moisture level of the crop (which can be detected by the moisture sensor 44) and/or a yield of the crop (which can be detected by the yield sensor 48). The controller 40 can use these data to automatically establish the critical speed value. However, an operator can intervene and modify this critical speed value using the operator interface 42, based on his experience and his personal assessment of the crop stream CS and the harvesting conditions.

Figure 6:
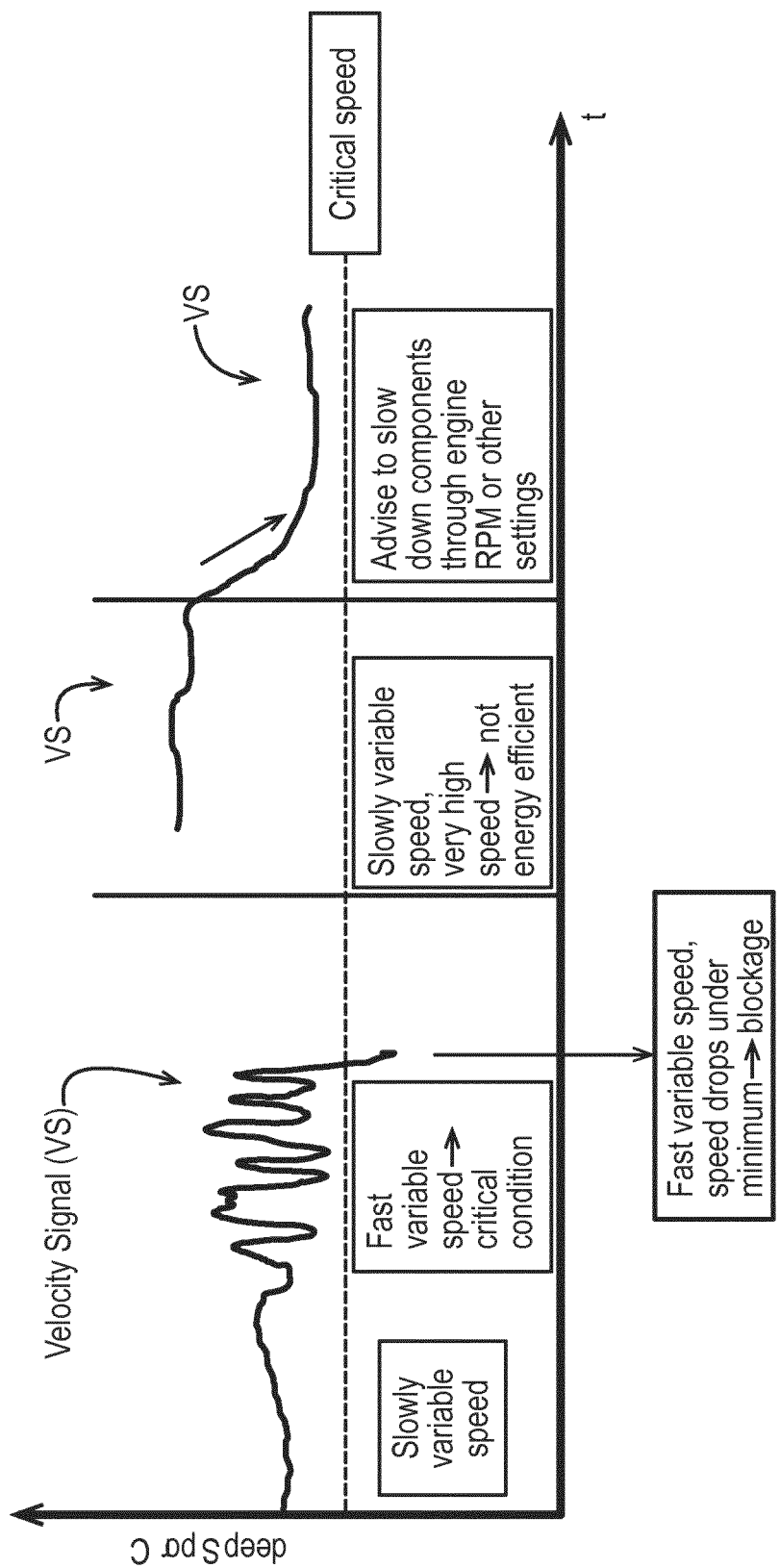
FIG. 6 is a chart for use in illustrating the control aspects addressed by the inventive nature of the present invention.

The crop discharge speed control system 30 address variations in the measured speed of the crop stream CS, as illustrated in FIG. 6, where in the left example the measured crop speed is slowly variable for a period of time, then there is a fast variation in the crop speed that leads to a drop in the speed to below the critical speed, which either leads to a blockage or is caused by a blockage. The crop discharge speed control system 30 monitors the variation in, or modulation of, the crop speed as the crop velocity sensor 50 provides the velocity signal VS to the controller 40. The controller 40 monitors the modulation of the velocity signal VS and increases the rotational speed of the accelerator 32 to provide a safety margin during times of high modulation of the velocity signal VS, in order to prevent the crop speed from falling below the critical speed.

Conversely, the condition shown in the right portion of FIG. 6, illustrates a low modulation of the velocity signal VS, in the left side portion of the right chart. As can be seen in the chart, the low modulation with the velocity signal VS being well above the critical speed indicates that energy can be saved. The crop discharge speed control system 30 detects the low modulation of the velocity signal VS and reduces the crop speed by reducing the rotational speed of the accelerator 32 by changing the ratio of the drive 36 and/or the RPMs of the engine 38, as shown on the right portion of the right chart.

Figure 7:
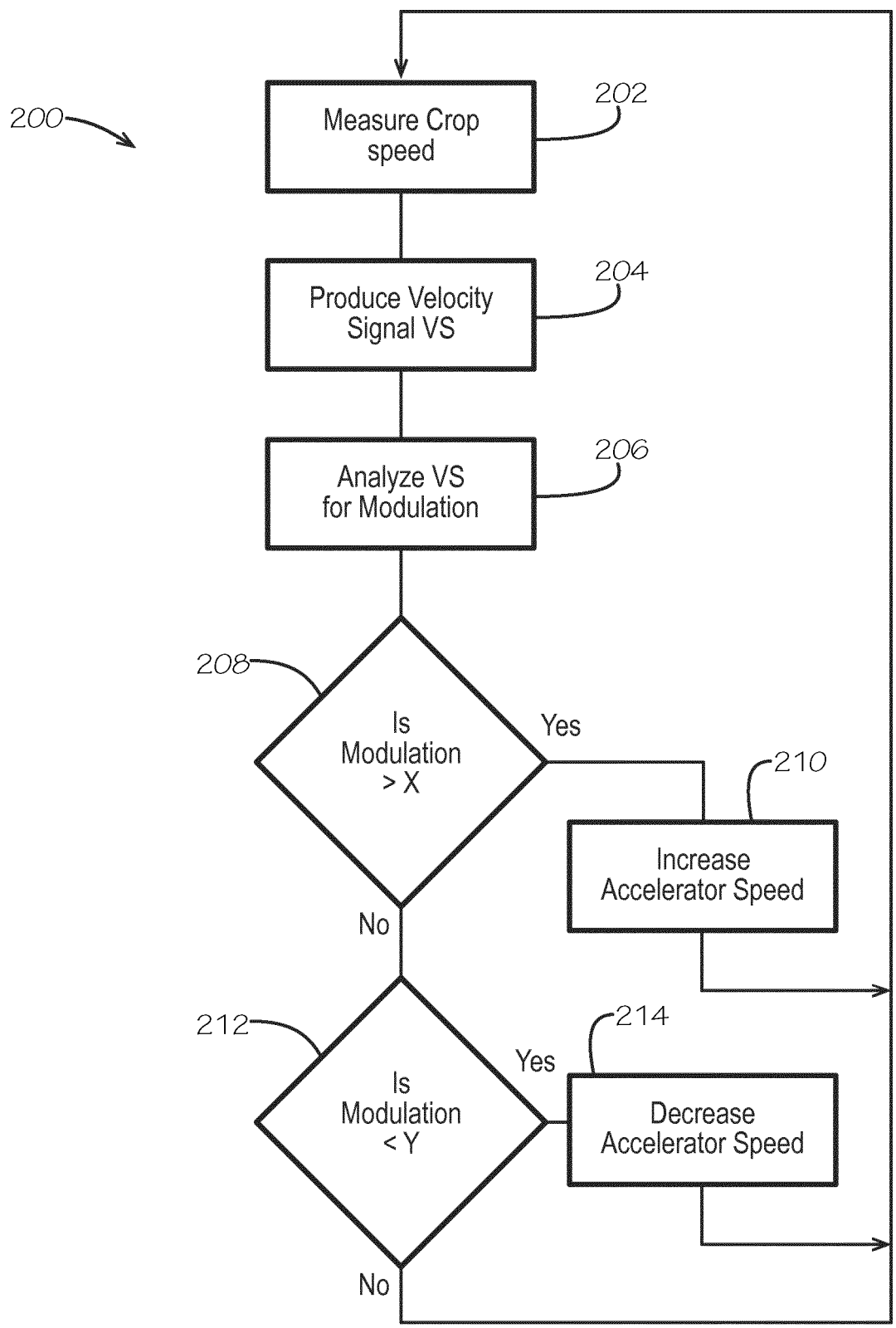
FIG. 7 is a flowchart that illustrates the functioning of an exemplary method of the present invention.

Now additionally referring to FIG. 7 there is illustrated an algorithm 200, which includes the steps of measuring a crop speed at step 202 that is carried out by the crop velocity sensor 50. The crop velocity sensor 50 generates the velocity signal VS at step 204, which the controller 40 uses to analyze to determine the rate of change of crop speed to determine the modulation of the velocity signal VS, at step 206. If the modulation is above a predetermined value X (step 208), then the safety margin above the critical speed value is increased and the rotational speed of the accelerator 32 is increased, to thereby provide sufficient margin to prevent a blockage from occurring in the system. When the modulation is relatively low, as discussed above relative to FIG. 6, which is detected at step 212, where the modulation of the velocity signal VS is below another predetermined value Y, then the safety margin is reduced, and the rotational speed of the crop accelerator 32 is reduced at step 214, in order to save energy, but still provide the needed crop velocity to put the crop stream CS in the desired location, and to prevent a blockage in the harvester 10.

The crop deflector 52 that is coupled to an end of the spout 24 has the angle sensor 54 and the load cell 56 coupled thereto. The angle sensor 54 detects the angle at which the deflector 52 is tilted. The tilt of the deflector 52 is used to direct and change the trajectory 12 of the crop stream CS. Since the trajectory 12 is altered by the deflector 52, the control system 30 tracks the angle to better predict the trajectory 12 of the crop stream CS. The load cell 56 detects the force being applied to the deflector 52 as the crop stream CS impinges against the deflector 52, so that the controller 40 can make an estimate of the trajectory 12 as well as a calculation of the amount of energy that can be added or subtracted from the crop stream CS to keep the velocity of the crop stream CS above the critical speed, but to save energy by operating the crop accelerator 32, the variable drive 36 and the engine 38 at optimal levels. The angle sensor 54 and/or the load cell 56 are configured to produce a deflector signal DS that is communicated to the controller 40, with the controller 40 using the deflector signal DS to vary the speed of the crop accelerator 32. Hence, by monitoring the deflector signal DS the speed control system 30 can take into account influences on the material stream CS beyond the location of the crop velocity sensor 50.

The controller 40 is further configured to give an alarm if the speed of the crop, as represented by the velocity signal VS, is below a threshold speed value, which is close to the critical crop speed value. The alarm is provided to the operator by way of the operator interface 42.

Advantageously, the crop discharge speed control system 30 is used to optimize the RPMs of the engine 38 to maintain ideal crop processing speeds. The crop processing speeds are defined by crop settings that are input into a memory of the controller 40 by way of the operator interface 42. The settings can include the critical speed value and a threshold speed value at which an alarm is sent to the operator to warn of operation out of the preferred range and even that a blockage has occurred. The present invention is also used to advise the operator to adjust settings to fine tune the crop flow performance, such as, to optimize the header 22 speed setting; the position of a concave forming the crop transition from the knife drum to a kernel processor 35 or the accelerator 32, as well as the accelerator 32 settings. Further the present invention is used to improve the projected location of the crop stream CS as it lands in the vehicle 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A crop discharge speed control system for a harvesting vehicle that gathers crop material, the harvesting vehicle having a crop accelerator and a spout that receives the crop material from the crop accelerator and directs the crop material to a targeted destination, the crop accelerator configured to impart an increased velocity to the crop material, the crop discharge speed control system comprising:
   a crop velocity sensor coupled to the spout of the harvesting vehicle for detecting a velocity of the crop material in the spout, the crop velocity sensor configured to produce a velocity signal representative of the velocity of the crop material;
   a controller in communication with the crop velocity sensor, the controller configured to receive the velocity signal; and
   a variable speed drive drivingly coupled to the crop accelerator,
   wherein the controller is further configured to control a speed of the crop accelerator by controlling the variable speed drive,
   wherein the controller is further configured to control the variable speed drive to maintain a selected velocity of the crop material dependent upon a determined modulation of the velocity signal, and
   wherein the controller is further configured to measure the modulation of the velocity signal and to effect a rotational speed of the crop accelerator to keep the velocity of the crop material above a selected critical speed value.

2. The crop discharge speed control system according to claim 1, wherein the crop velocity sensor does not contact the crop material as it moves through the spout.

3. The crop discharge speed control system according to claim 1, wherein the spout has a transparent portion, and the crop velocity sensor is directed toward the transparent portion.

4. The crop discharge speed control system according to claim 3, wherein the transparent portion is transparent to an emitted signal from the crop velocity sensor.

5. The crop discharge speed control system according to claim 1, wherein the crop velocity sensor is a radar sensor, the radar sensor being a singular measurement point.

6. The crop discharge speed control system according to claim 5, wherein the radar sensor uses a Doppler measurement technique to measure the crop velocity and to construct the velocity signal.

7. The crop discharge speed control system according to claim 5, wherein the radar sensor is configured to measure the velocity of the crop material as the crop material travels in the spout away from the radar sensor.

8. The crop discharge speed control system according to claim 1, wherein the crop velocity sensor is coupled to the spout toward a distal end of the spout.

9. The crop discharge speed control system according to claim 7, wherein the controller is further configured to control the variable speed drive by using a proportional-integral-derivative algorithm.

10. The crop discharge speed control system according to claim 1, wherein the controller is further configured to automatically select the critical speed value based upon one or more of a type of crop, a moisture level of the crop, or a yield of the crop.

11. The crop discharge speed control system according to claim 1, wherein the controller is further configured to receive and store the critical speed value selected by an operator.

12. The crop discharge speed control system according to claim 1, further comprising a crop deflector coupled to an end of the spout, the crop deflector having an angle sensor or a load cell coupled to the deflector, at least one of the angle sensor and the load cell being configured to produce a deflector signal that is communicated to the controller, the controller being further configured to vary the speed of the crop accelerator dependent upon the deflector signal.

13. The crop discharge speed control system according to claim 1, wherein the controller is further configured to give an alarm if the speed of the crop accelerator is below a threshold speed.

14. The crop discharge speed control system according to claim 1, wherein the controller is configured to control the speed of the crop accelerator by controlling an RPM of an engine of the harvesting vehicle.

15. A harvesting vehicle comprising a crop discharge speed control system according to claim 1, wherein the harvesting vehicle is a forage harvester.

16. A crop discharge speed control system for a harvesting vehicle that gathers crop material, the harvesting vehicle having a crop accelerator and a spout that receives the crop material from the crop accelerator and directs the crop material to a targeted destination, the crop accelerator configured to impart an increased velocity to the crop material, the crop discharge speed control system comprising:
   a crop velocity sensor coupled to the spout of the harvesting vehicle for detecting a velocity of the crop material in the spout, the crop velocity sensor configured to produce a velocity signal representative of the velocity of the crop material;
   a controller in communication with the crop velocity sensor, the controller configured to receive the velocity signal; and
   a variable speed drive drivingly coupled to the crop accelerator,
   wherein the controller is further configured to control a speed of the crop accelerator by controlling the variable speed drive, and
   wherein the controller is further configured to measure a modulation of the velocity signal and to use the measure of modulation to effect a rotational speed of the variable speed drive that is coupled to the crop accelerator to keep the velocity of the crop material above a selected critical speed value.

* * * * *